(12) United States Patent
Larsen

(10) Patent No.: US 10,972,825 B2
(45) Date of Patent: Apr. 6, 2021

(54) LOW POWER WIRELESS CHARGING USING TUNED NFC FOR HEADPHONE DEVICES

(71) Applicant: BBY SOLUTIONS, INC., Richfield, MN (US)

(72) Inventor: Jan PT Larsen, Hudson, WI (US)

(73) Assignee: BBY SOLUTIONS, INC., Richfield, MN (US)

( * ) Notice: Subject to any disclaimer, the term of this patent is extended or adjusted under 35 U.S.C. 154(b) by 252 days.

(21) Appl. No.: 16/263,977

(22) Filed: Jan. 31, 2019

(65) Prior Publication Data

US 2020/0252713 A1    Aug. 6, 2020

(51) Int. Cl.
    *H02J 7/00*     (2006.01)
    *H04R 1/10*     (2006.01)
    *H04B 5/00*     (2006.01)
    *H02J 50/10*    (2016.01)

(52) U.S. Cl.
    CPC ............ *H04R 1/1025* (2013.01); *H02J 50/10* (2016.02); *H04B 5/0075* (2013.01); *H04R 1/1016* (2013.01); *H04R 2420/07* (2013.01)

(58) Field of Classification Search
    CPC ........ H02J 7/025; H01F 38/14; Y02T 90/122; B60L 11/182; Y02E 60/12
    See application file for complete search history.

(56) References Cited

U.S. PATENT DOCUMENTS

| | | | | |
|---|---|---|---|---|
| 7,548,040 B2 * | 6/2009 | Lee | ....................... | H04R 1/1025 320/108 |
| 9,972,895 B2 * | 5/2018 | Hirsch | ................. | H01Q 1/2291 |
| 2004/0252812 A1 * | 12/2004 | Waldron | ................. | H04M 1/03 379/52 |
| 2011/0115429 A1 * | 5/2011 | Toivola | ................... | H01F 38/14 320/108 |

(Continued)

FOREIGN PATENT DOCUMENTS

| CN | 203708487 U | 7/2014 |
|---|---|---|
| CN | 105071553 A | 11/2015 |

(Continued)

OTHER PUBLICATIONS

"NFC Energy Harvesting Booster Pack", [online]. [retrieved on May 8, 2019]. Retrieved from the Internet: <URL: https://www.hackster.io/team-energy-boost/nfc-energy-harvesting-booster-pack-f10dcf>, (published Aug. 3, 2015), 8 pgs.

(Continued)

*Primary Examiner* — Arun C Williams
(74) *Attorney, Agent, or Firm* — Schwegman Lundberg & Woessner, P.A.

(57) ABSTRACT

Various systems and methods may be used to provide charge to a battery and play audio. For example, a wireless headphone device may include one or more coils, such as a first coil which may be actuatable at an audio frequency. The first coil or a second coil may be tuned to a charging frequency to receive a charge (e.g., via induction) from a charging device. In an example, the wireless headphone device may (Continued)

be a true wireless headphone device. In an example, the true wireless headphone device includes a single coil, which is actuatable to play sound as well as receive a charge at a charging frequency.

19 Claims, 6 Drawing Sheets

(56) References Cited

U.S. PATENT DOCUMENTS

| | | | |
|---|---|---|---|
| 2012/0189146 A1* | 7/2012 | Wuidart | H04R 25/554 |
| | | | 381/312 |
| 2012/0231856 A1* | 9/2012 | Lee | H02J 50/00 |
| | | | 455/573 |
| 2014/0021799 A1 | 1/2014 | Sankararamalingam et al. | |
| 2014/0117921 A1* | 5/2014 | Suomela | H02J 7/342 |
| | | | 320/103 |
| 2015/0108942 A1 | 4/2015 | Lin et al. | |
| 2017/0063431 A1 | 3/2017 | Milne et al. | |
| 2017/0064433 A1* | 3/2017 | Hirsch | H05K 999/99 |
| 2019/0089187 A1* | 3/2019 | Konomi | H02J 50/12 |
| 2019/0174239 A1* | 6/2019 | Niklaus | H04R 25/602 |

FOREIGN PATENT DOCUMENTS

| | | |
|---|---|---|
| JP | 2016-226230 A | 12/2016 |
| WO | WO-2016/194643 A1 | 12/2016 |

OTHER PUBLICATIONS

Strommer, Esko, et al., "NFC-enabled Wireless Charging", *In Proceedings of the 4th International Workshop on Near Field Communication.* (2012), 36-41.

\* cited by examiner

LOW POWER WIRELESS CHARGING USING TUNED NFC FOR HEADPHONE DEVICES

TECHNICAL FIELD

Embodiments described herein generally relate to wireless headphones, and in particular, to techniques for using near field communication to charge a battery of a wireless headphone.

BACKGROUND

Wireless headphones and true wireless headphones may refer to different types of headphones. For example, wireless headphones often include a pair of headphones connected to each other (e.g., over the head or behind the head), but otherwise not physically connected to a device providing audio to the wireless headphones. True wireless headphones, as the name suggests, do not include any cords, meaning a pair of headphones are wirelessly connected to a device providing audio, and are not connected to each other by a wire. True wireless headphones may be wirelessly in communication with each other or not.

Wireless headphones and true wireless headphones typically have a battery that must be recharged in between or during uses. To charge the battery, current techniques usually are limited to physical contact charging. For example, headphones may be plugged in to a cord or inserted into a charging device. Other headphones may rely on wireless charging using standard wireless charging techniques, such as the open interface standard Qi wireless charging as put forth by the Wireless Power Consortium, which uses induction to charge the headphones.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Today's wireless headphones utilize small capacity batteries (e.g., 3.7 v or 7.4 v at 20-200 ma) to operate the devices. These devices may allow charging with mechanical (contact) connections. The systems and techniques described herein use near field communication (NFC) as a charge field, in addition to, or instead of, a communication protocol. The use of NFC for charging allows wireless, non-contact charging of devices, including in wireless or true wireless headphone device form factors.

In an example, an NFC transmission device uses a RF field to induce enough power into an external wireless antenna (e.g., included in wireless headphones) to allow communication with a tag, label, or device. The systems and techniques described herein use this same power field to induce and harvest energy to charge smaller capacity batteries.

NFC receiver components in wireless headphones may take on several variations. In an example, a standard NFC coil antenna may be used, in addition to other components of the wireless headphones. In another example, a dual diversity circuit may be used to switch between a GHz standard RF antenna, such as Bluetooth classic or Bluetooth Low Energy (BLE) and an NFC tuned frequency used for energy transfer charging. In yet another example, a speaker driver coil of the wireless headphones may be used as a tuned NFC antenna, such as when not used as a headphone audio driver (or in other examples, the speaker driver coil may be used simultaneously as a tuned NFC antenna or audio driver). In still another example, a speaker driver coil and a secondary coil tuned as an NFC antenna may be used, such as when not used as headphone audio driver.

In an example, a smart device (e.g., phone, tablet, etc.) that supports NFC transmission or a custom charge platform, may act as a wireless charger for the battery operated wireless device. Additionally, a NFC transmission supported product may be utilized to output RF energy to a custom device, for general energy harvesting and operation. For example, a custom device may have LED indicators that are charged using the systems and techniques described herein, such as for runners at night. In this example, non-contact operation is a significant improvement over contact charging, allowing embedding of robust electronics into fabrics, shoes, or the like.

Figure 1:
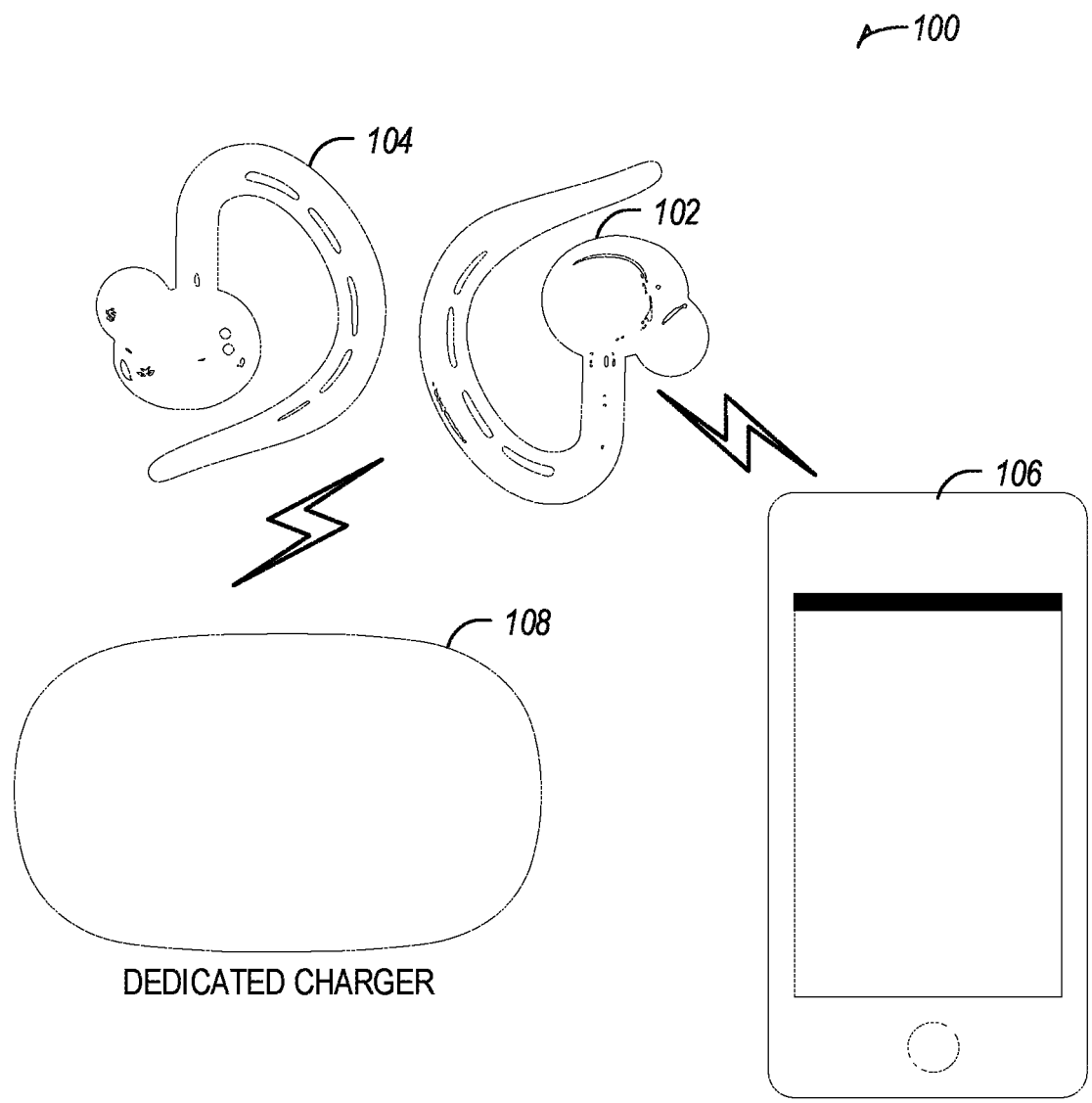
FIG. 1 illustrates a pair of true wireless headphones, which may be wirelessly charged using a charging device or a mobile phone, according to an example.

FIG. 1 illustrates a pair of true wireless headphones 102 and 104, which may be wirelessly charged using a charging device 108 or a mobile phone 106, according to an example. Although the true wireless headphones 102 and 104 are shown, other wireless headphones (e.g., with two earbud portions that are connected via a wire or cord) may be used with the systems and techniques described herein. Similarly, charging devices other than those shown may be used with the systems and techniques described herein.

The pair of true wireless headphones 102 and 104 may each include circuitry to tune a coil to a particular frequency, such as an NFC frequency, (e.g., 13.58 MHz). The NFC frequency may be a charging frequency in addition to being an NFC transmission frequency. In an example, when one of the pair 102 or 104 is close to the charger 108 or the mobile device 106, a communications connection may be generated, and in response, charging may be initiated. In another example, charging may be initiated automatically (e.g., when in proximity to the charging device 108 or the mobile device 106).

In an example, a burst signal may be used for charging. During pauses, the headphones 102 or 104 may send information back to the charging device 108 or the mobile device 106.

In an example, the headphones 102 and 104 may charge and output sound at the same time. For example, audio is output typically at 20 Hz-20 KHz, while charging may be at around 13 MHz. In an example, for playing sound, a coil impedance may be very low, driven by an amplifier. The coil impedance may be higher when charging.

In an example, when charging one or both of the pair of true wireless headphones 102 or 104 using NFC charging, alignment with a charging device (e.g., mobile device 106 or charger 108) may be important for generating more power or a quicker charge. Feedback may be generated at the charging device when alignment is good (e.g., allows for transfer of charge above a threshold amount) or not good (e.g., only allows for limited transfer of charge, such as below the threshold). For example, a light, audible feedback, haptic feedback or the like at the charging device or at one of the pair of true wireless headphones 102 or 104 may be generated indicating a good or not good alignment for charging via NFC.

FIG. 1 illustrates true wireless headphones as an example. Other devices, such as a set of wireless headphones where the ear portions are connected to each other, or non-wireless headphones with wireless charging (e.g., for batteries used for noise cancelation), may be used with the systems and techniques described herein.

Figure 2:
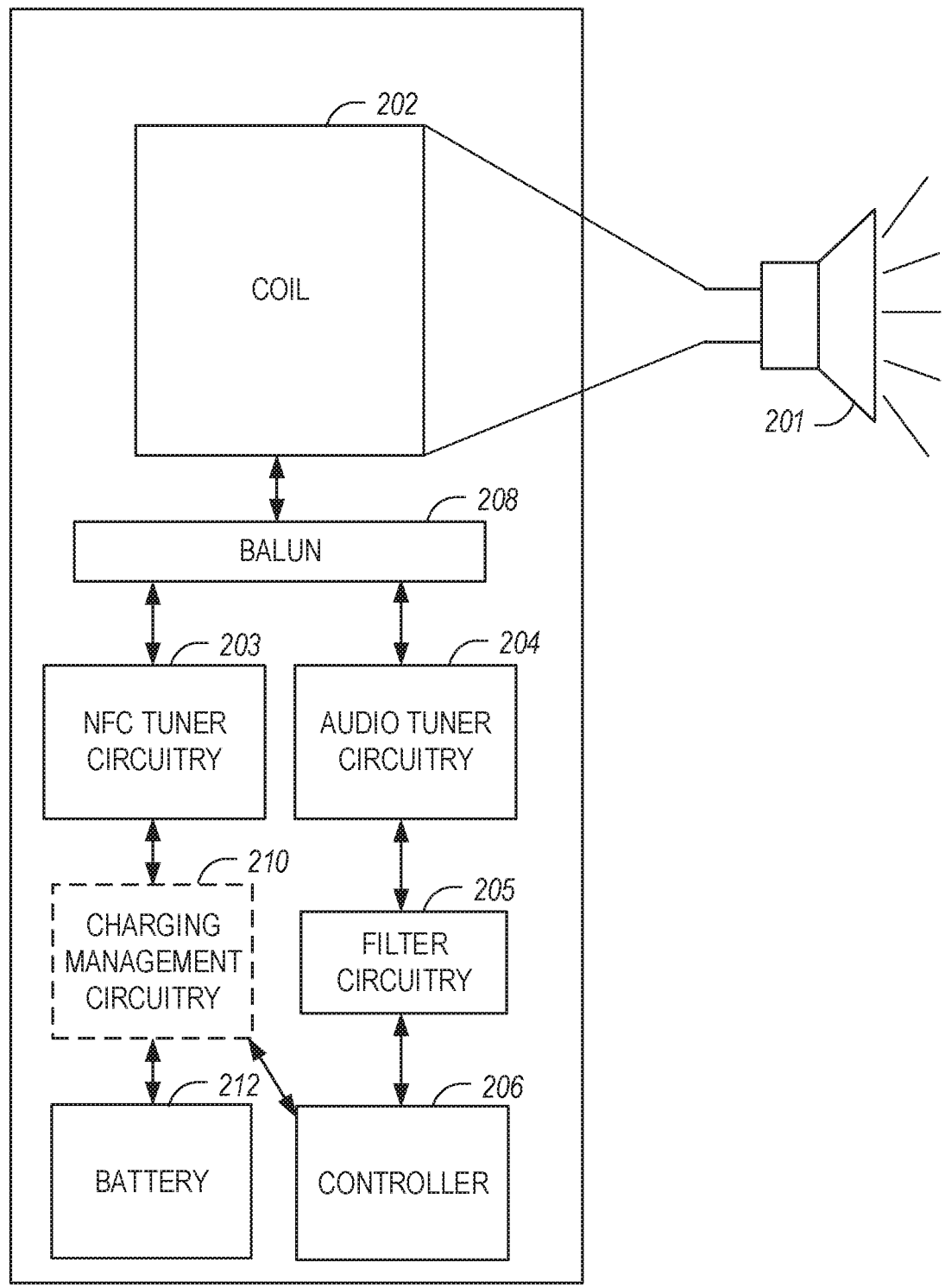
FIGS. 2-4 illustrate example configurations for devices such as wireless headphones, true wireless headphones, wired headphones, or the like, according to an example.
Figure 3:
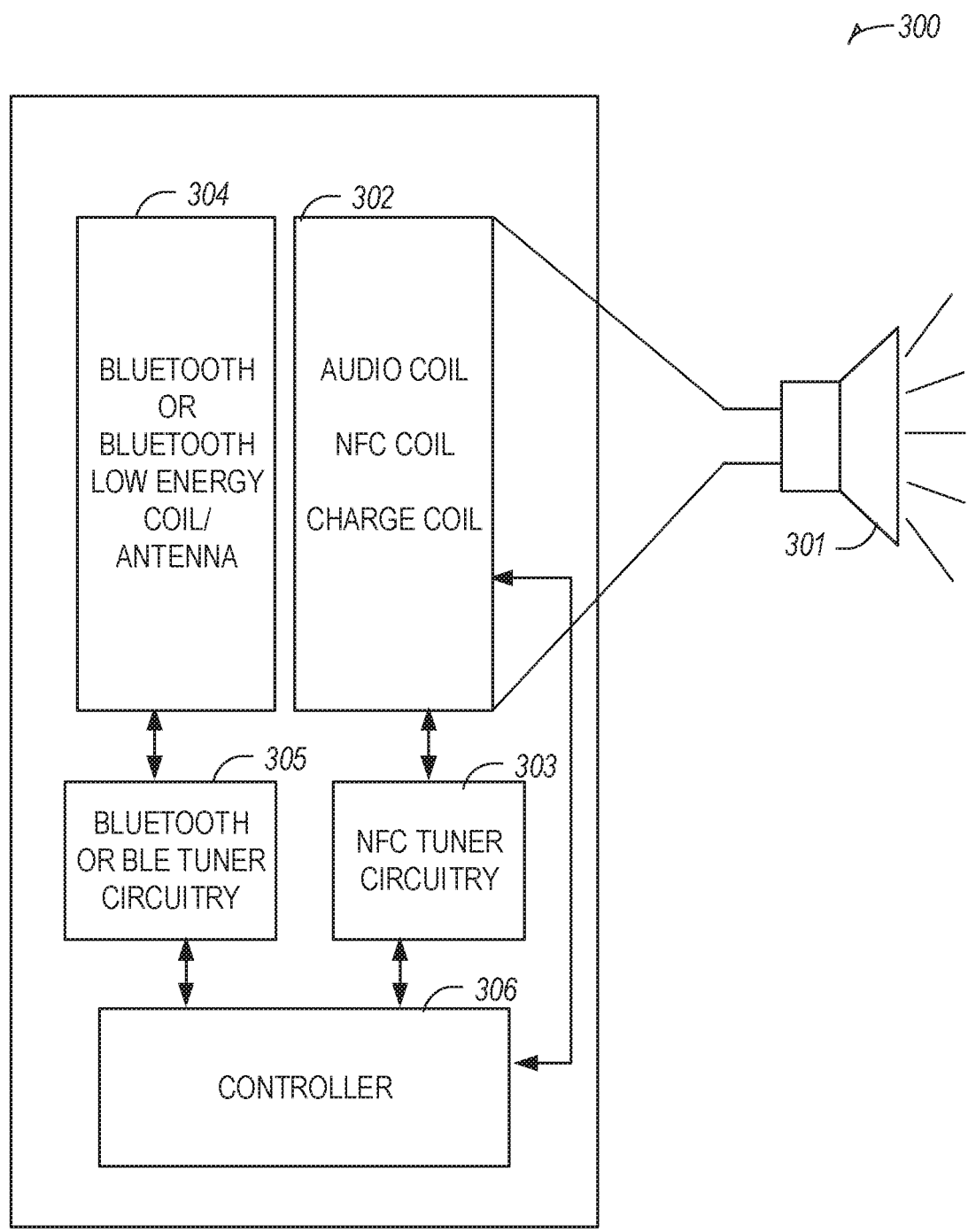
Figure 4:
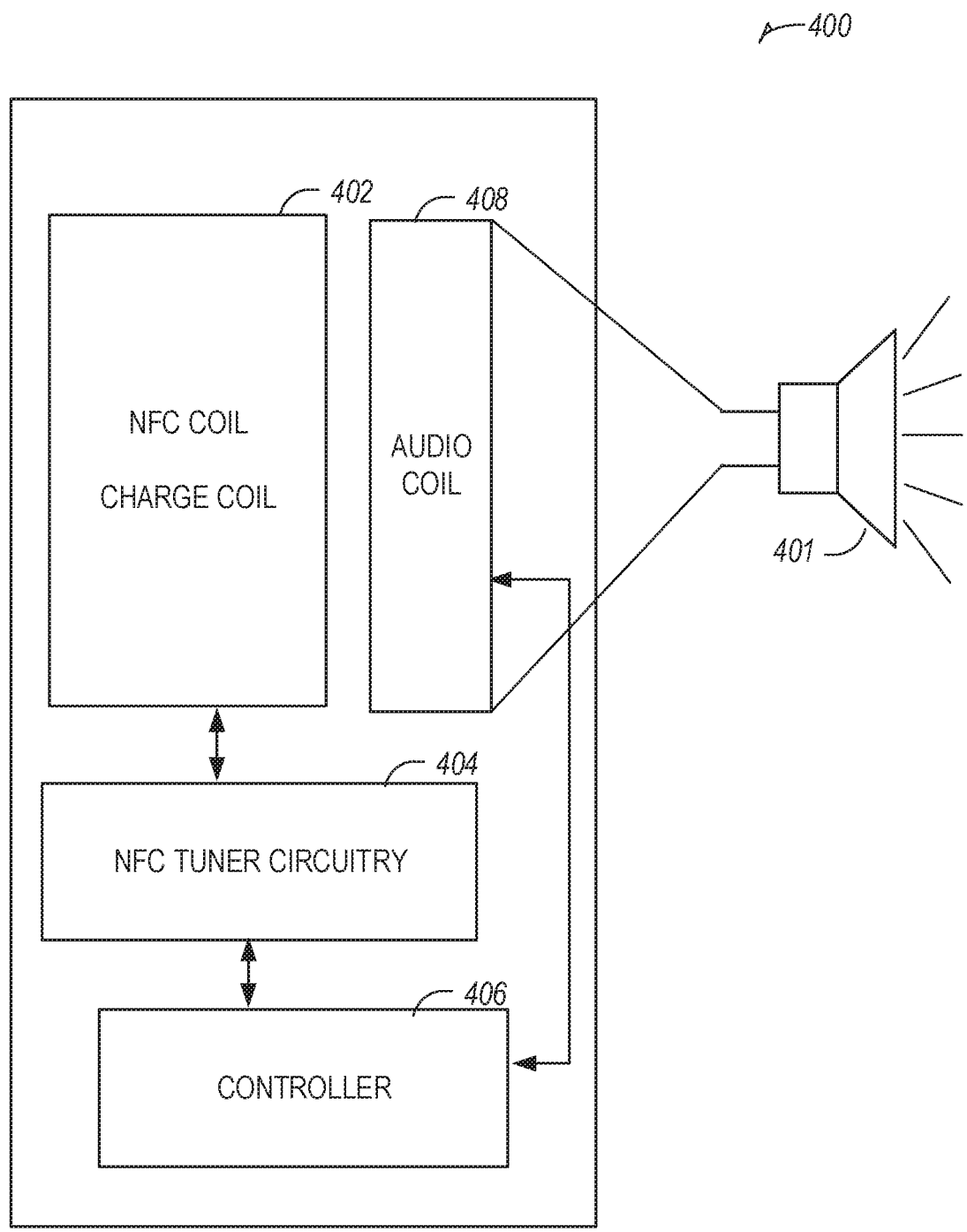

FIG. 2-4 illustrate example configurations for a wireless headphone, according to an example.

FIG. 2 illustrates a device 200 (e.g., wireless headphones or true wireless headphones) and includes a single coil 202 used to provide audio, receive an NFC signal or charge, and receive a charge at an NFC frequency, in an example. In other examples, the single coil 202 is used to provide audio and NFC signaling/charging. The single coil 202 may be part of a speaker 201. For example, when actuated, the single coil 202 may vibrate a membrane to cause a sound to be amplified and played.

The headphone device 200 includes a balun 208 (e.g., a transformer to convert between a high impedance unbalanced line and a low impedance balanced line). The balun 208 may pass the unbalanced high impedance line to NFC tuner circuitry 203 to receive an NFC signal or receive a charge via NFC. The balun 208 may pass the balanced low impedance line to audio tuner circuitry 204 to play audio on the coil 202.

In an example, an NFC charge is received on the coil 202, passes through the balun 208 at a high impedance to the NFC tuner circuitry 203, which then tunes the received frequency to charge a battery 212. Optional charging management circuitry 210 may be used between the NFC tuner circuitry 203 and the battery 212 to allow for safety cut off, automatic turning off of any charging of the battery 212, or other charging/discharging maintenance or safety actions with regard to the battery 212.

A controller 206 may be used to switch between NFC signal reception or transmission, NFC charging, audio playback, Bluetooth signal reception or transmission, or the like. The controller 206 may also control aspects of charging or audio playback. For example, the controller 206 may receive audio bits (e.g., via a Bluetooth transceiver, not shown) to play on the speaker 201.

In an example, audio is to be played at the speaker 201. The controller 206 may initiate audio play by activating the balun 208 to switch to the low impedance line, activate the audio tuner circuitry 204, and use filter circuitry 205 to generate sound by actuating the coil 202 to vibrate a membrane of the speaker 201.

The controller 206 may include a system on a chip (SOC), a microcontroller (MCU), a processor, a hardwired circuitry configuration, or the like. The controller 206 may switch the coil 202 from one frequency modality to another. For example, an audio frequency may be generated on the coil, and the coil may then be tuned to a charging frequency. The circuitry may be connected to a battery to charge the battery using the coil 202. In an example, the circuitry may determine when the battery is fully charged, and send an indication (e.g., transmit via the coil 202) to a charging device that the charging is complete, causing the charging device to stop the charge.

FIG. 3 illustrates a device 300 (e.g., wireless headphones or true wireless headphones) that includes a single coil 302 used to provide audio, receive an NFC signal, and receive a charge at an NFC frequency. The device 300 may include a second coil or antenna 304 to receive a Bluetooth signal.

The Bluetooth tuning 305 may be used to tune the coil or antenna 304 to the Bluetooth frequency, for example to receive an indication that NFC charging is available. In response to receiving the Bluetooth indication, the device may use the coil 302 to charge. For example, the coil 302 may be tuned to the charging frequency (e.g., by the NFC tuner circuitry 303) to receive the charge. The controller 306 (e.g., a system on a chip (SOC), a microcontroller (MCU), a processor, a hardwired circuitry configuration, or the like) may control the tuning circuitry 303 or 305. The coil 302 may also be used to play a sound (e.g., using other components of the speaker 301).

FIG. 4 illustrates a device 400 (e.g., wireless headphones or true wireless headphones) that includes a first coil 408 used to provide audio, and a second coil 402 to receive an NFC signal and receive a charge at an NFC frequency.

A controller 406 may cause NFC tuner circuitry 404 to tune the second coil 402 to an NFC frequency to receive a charge. The first coil 408 may use components of the speaker 401 to play sound, which may be controlled by the controller 406 (e.g., a system on a chip (SOC), a microcontroller (MCU), a processor, a hardwired circuitry configuration, or the like).

Figure 5:
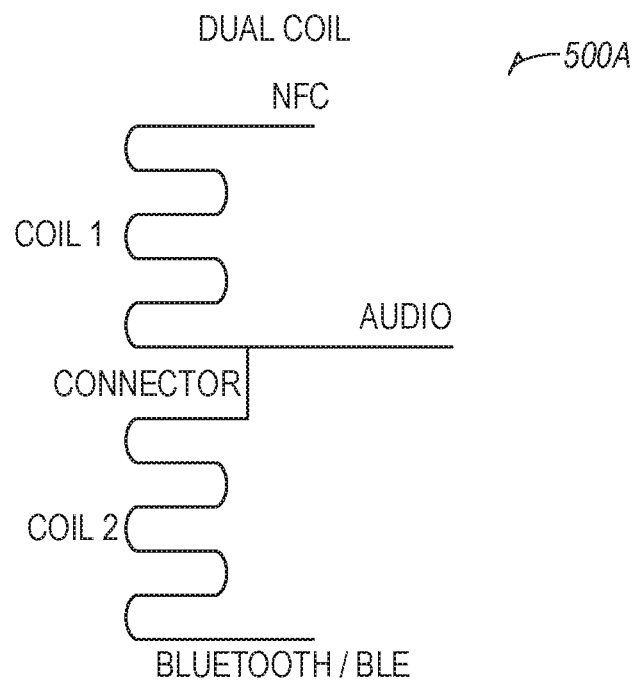
FIG. 5 illustrates coil configurations according to an example.
Figure 5:
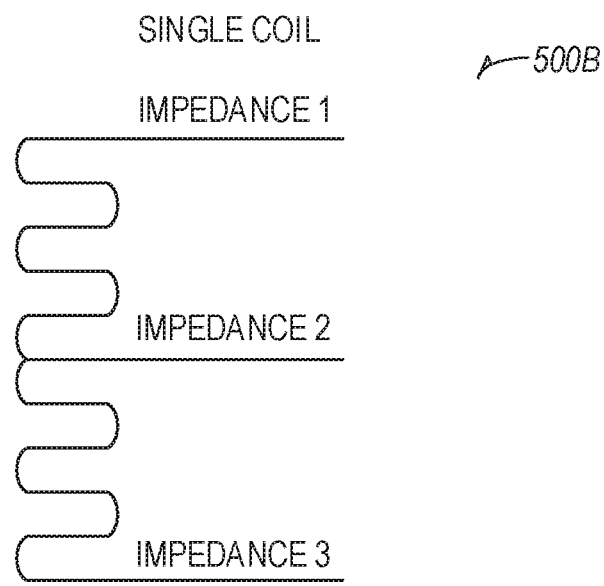

FIG. 5 illustrates a dual coil 500A and a single coil 500B. The dual coil 500A includes a first coil (coil 1) and a second coil (coil 2) connected by a connector (e.g., hardwired, soldered, etc.). The dual coil 500A may be used to receive an NFC signal or charge, an audio signal, and a Bluetooth signal. For example, coil 1 may be used to attenuate an NFC signal or charge while coil 2 is used to attenuate a Bluetooth signal. The additional wiring at the connector or intersection of the two coils may be used to play audio. The dual coil 500A may be used in the device 200 described with respect to FIG. 2. In an example, the dual coil 500A may be used in the device 300 described with respect to FIG. 3, for example with the connector of the dual coil 500A connecting the coil 302 and the coil 304 of FIG. 3. In another example, a dual coil similar to the one shown in FIG. 5 may be used with device 400 of FIG. 4. For example, a dual coil may connect the NFC signal/charge coil 402 with the audio coil 408 of FIG. 4. In this example, the audio component of the dual coil may replace the Bluetooth component rather than be located at the connector.

The signal coil 500B includes different levels of impedance at different portions of the single coil 500B. In the example shown in FIG. 5, three different impedance levels are shown (impedance 1-3). In other examples, two or more than three impedance levels may be introduced on the single coil 500B. In the example shown in FIG. 5, the different impedance levels may be used for NFC signaling/charging, audio, or Bluetooth. In other examples, the single coil 500B may be used to support two impedance levels, for example for NFC signaling/charging and audio. In these examples a Bluetooth coil may be separate from the single coil 500B.

Figure 6:
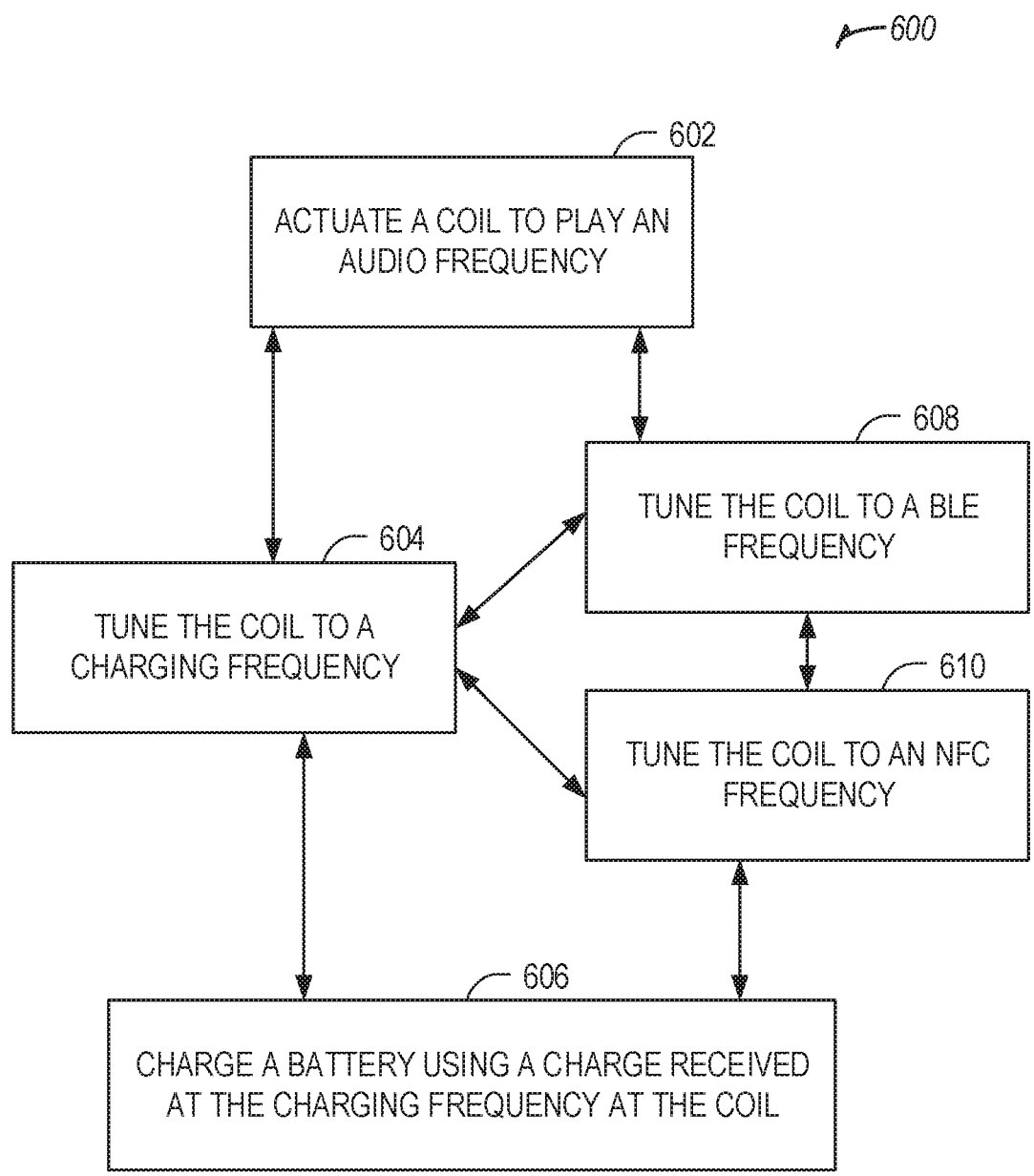
FIG. 6 illustrates a flowchart of a method for charging a battery of a wireless headphone device according to an example.

FIG. 6 illustrates a flowchart 600 of a method for charging a battery of a wireless headphone device according to an example.

The flowchart includes an operation 602 to actuate a first coil to play an audio frequency (e.g., the first coil may be actuated to the audio frequency to play a sound).

The flowchart includes an operation 604 to tune a coil (e.g., the first coil or a second coil) to a charging frequency. When the first coil is tuned, the first coil may be tuned to the charging frequency with or without stopping the audio from playing. When the second coil is tuned, the second coil may charge independently of the first coil playing the audio frequency, in an example.

The flowchart includes an operation 606 to charge a battery using a charge received at the charging frequency at the coil. In an example, the charging frequency may comply with the NFC or the RFID communication standard. For example, the charging frequency may be 13.56 MHz, which is a high frequency RFID standard frequency.

The flowchart includes an optional operation 608 to tune the coil to a Bluetooth frequency, for example, to receive an indication complying with a Bluetooth standard (e.g., Bluetooth classic or BLE). In an example, the indication may include information directing the coil to be tuned to the NFC frequency to receive a charge from a charging device. In an example, the indication may be received from the charging device.

The flowchart includes an optional operation 610 to tune the coil to an NFC frequency, for example, to receive an indication complying with an NFC or RFID standard. In an example, the indication may include information indicating a charge is forthcoming from a charging device. In an example, the indication may be received from the charging device.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a true wireless headphone device comprising: a speaker comprising a coil actuatable at an audio frequency to play sound; a tuning circuit to tune the coil to a charging frequency; circuitry to receive an NFC indication from a charging device via the coil and in response, cause the tuning circuit to tune the coil to the charging frequency.

In Example 2, the subject matter of Example 1 includes, wherein the tuning circuit includes a balun and a resistor/capacitor network.

In Example 3, the subject matter of Examples 1-2 includes, wherein the charging frequency is 13.56 MHz.

In Example 4, the subject matter of Examples 1-3 includes, wherein the circuitry is further to determine that a battery charged via the coil has reached a charging cutoff and cause the tuning circuit to tune the coil to a frequency other than the charging frequency.

In Example 5, the subject matter of Examples 1-4 includes, wherein the charging device is a mobile phone.

In Example 6, the subject matter of Examples 1-5 includes, wherein the charging device is a dedicated charging case.

In Example 7, the subject matter of Examples 1-6 includes, wherein the coil is actuated at the audio frequency to play sound and tuned to the charging frequency to receive the NFC indication simultaneously.

In Example 8, the subject matter of Examples 1-7 includes, wherein when the coil is actuated at the audio frequency to play sound, the coil is not tuned to the charging frequency.

In Example 9, the subject matter of Examples 1-8 includes, a housing including a portion insertable into an ear.

In Example 10, the subject matter of Example 9 includes, wherein the housing is further configured to hold the battery.

In Example 11, the subject matter of Example 10 includes, physical contacts configured to receive a contact charge.

Example 12 is a true wireless headphone device comprising: a speaker comprising a first coil and an audio circuit to actuate the first coil at an audio frequency; a second coil configured to receive an NFC signal, the second coil coupled to a battery to provide a charge for the battery; and a tuning circuit to tune the second coil to a charging frequency, the charging frequency corresponding to the NFC signal.

In Example 13, the subject matter of Example 12 includes, a housing including a portion insertable into an ear.

In Example 14, the subject matter of Example 13 includes, wherein the housing is further configured to hold the battery.

In Example 15, the subject matter of Examples 12-14 includes, physical contacts configured to receive a contact charge.

Example 16 is a true wireless headphone device comprising: a speaker comprising a first coil and an audio circuit to actuate the first coil at an audio frequency; a second coil configured to receive an NFC signal and a Bluetooth signal, the second coil coupled to a battery to provide a charge for the battery; and a first tuning circuit to tune the second coil, in response to receiving the Bluetooth signal, from a Bluetooth frequency corresponding to the Bluetooth signal to a charging frequency, the charging frequency corresponding to the NFC signal.

In Example 17, the subject matter of Examples 13-16 includes, a second tuning circuit to tune the second coil to a Bluetooth frequency.

In Example 18, the subject matter of Examples 14-17 includes, a circuit switcher to change between the first and second tuning circuits.

Example 19 is a true wireless headphone device comprising: a speaker comprising a coil; a tuning circuit to actuate the coil at an audio frequency and to tune the coil to a charging frequency; circuitry to: receive a Bluetooth indication via the coil from a charging device; and in response to receiving the Bluetooth indication, cause the tuning circuit to tune the coil to the charging frequency, the charging frequency corresponding to a received NFC signal.

Example 20 is at least one machine-readable medium including instructions that, when executed by processing circuitry, cause the processing circuitry to perform operations to implement of any of Examples 1-19.

Example 21 is an apparatus comprising means to implement of any of Examples 1-19.

Example 22 is a system to implement of any of Examples 1-19.

Example 23 is a method to implement of any of Examples 1-19.

What is claimed is:

1. A true wireless headphone device comprising:
   a speaker comprising a coil actuatable at an audio frequency to play sound;
   a tuning circuit to tune the coil to a charging frequency;
   circuitry to receive a near field communication (NFC) indication from a charging device via the coil and in response, cause the tuning circuit to tune the coil to the charging frequency.

2. The true wireless headphone device of claim 1, wherein the tuning circuit includes a balun and a resistor/capacitor network.

3. The true wireless headphone device of claim 1, wherein the charging frequency is 13.56 MHz.

4. The true wireless headphone device of claim 1, wherein the circuitry is further to determine that a battery charged via the coil has reached a charging cutoff and cause the tuning circuit to tune the coil to a frequency other than the charging frequency.

5. The true wireless headphone device of claim 1, wherein the charging device is a mobile phone.

6. The true wireless headphone device of claim 1, wherein the charging device is a dedicated charging case.

7. The true wireless headphone device of claim 1, wherein the coil is actuated at the audio frequency to play sound and tuned to the charging frequency to receive the NFC indication simultaneously.

8. The true wireless headphone device of claim 1, wherein when the coil is actuated at the audio frequency to play sound, the coil is not tuned to the charging frequency.

9. The true wireless headphone device of claim 1, further comprising a housing including a portion insertable into an ear.

10. The true wireless headphone device of claim 9, wherein the housing is further configured to hold the battery.

11. The true wireless headphone device of claim 10, further comprising physical contacts configured to receive a contact charge.

12. A true wireless headphone device comprising:
a speaker comprising a first coil and an audio circuit to actuate the first coil at an audio frequency;
a second coil configured to receive a near field communication (NFC) signal, the second coil coupled to a battery to provide a charge for the battery; and
a tuning circuit to tune the second coil to a charging frequency, the charging frequency corresponding to the NFC signal.

13. The true wireless headphone device of claim 12, further comprising a housing including a portion insertable into an ear.

14. The true wireless headphone device of claim 13, wherein the housing is further configured to hold the battery.

15. The true wireless headphone device of claim 12, further comprising physical contacts configured to receive a contact charge.

16. A true wireless headphone device comprising:
a speaker comprising a first coil and an audio circuit to actuate the first coil at an audio frequency;
a second coil configured to receive a near field communication (NFC) signal and a Bluetooth signal, the second coil coupled to a battery to provide a charge for the battery; and
a first tuning circuit to tune the second coil, in response to receiving the Bluetooth signal, from a Bluetooth frequency corresponding to the Bluetooth signal to a charging frequency, the charging frequency corresponding to the NFC signal.

17. The true wireless headphone device of claim 13, further comprising a second tuning circuit to tune the second coil to a Bluetooth frequency.

18. The true wireless headphone device of claim 14, further comprising a circuit switcher to change between the first and second tuning circuits.

19. A true wireless headphone device comprising:
a speaker comprising a coil;
a tuning circuit to actuate the coil at an audio frequency and to tune the coil to a charging frequency; and
circuitry to:
receive a Bluetooth indication via the coil from a charging device; and
in response to receiving the Bluetooth indication, cause the tuning circuit to tune the coil to the charging frequency, the charging frequency corresponding to a received near field communication (NFC) signal.

* * * * *